United States Patent
Sugizaki et al.

(10) Patent No.: US 7,046,433 B2
(45) Date of Patent: May 16, 2006

(54) OPTICAL FIBER, AND OPTICAL MODULE AND RAMAN AMPLIFIER USING THE OPTICAL FIBER

(75) Inventors: Ryuichi Sugizaki, Chiyoda-ku (JP); Takeshi Yagi, Chiyoda-ku (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 161 days.

(21) Appl. No.: 10/747,180

(22) Filed: Dec. 30, 2003

(65) Prior Publication Data

US 2005/0146781 A1  Jul. 7, 2005

(51) Int. Cl.
*H01S 3/00* (2006.01)
*G02B 6/10* (2006.01)

(52) U.S. Cl. .................. 359/341.5; 385/127
(58) Field of Classification Search .............. 359/334, 359/341.5; 385/127
See application file for complete search history.

(56) References Cited

U.S. PATENT DOCUMENTS 6,470,126 B1 * 10/2002 Mukasa ................ 385/123
6,661,958 B1 * 12/2003 Hirano et al. ........... 385/127
6,859,599 B1 * 2/2005 Mukasa ................ 385/127
2002/0051611 A1 * 5/2002 Mukasa ................ 385/123
2003/0063881 A1 * 4/2003 Hebgen et al. .......... 385/127

OTHER PUBLICATIONS

U.S. Appl. No. 10/747,180, filed Dec. 30, 2003, Sugizaki et al.
U.S. Appl. No. 11/128,209, filed May 13, 2005, Hiroishi et al.

\* cited by examiner

*Primary Examiner*—Mark Hellner
(74) *Attorney, Agent, or Firm*—Oblon, Spivak, McClelland, Maier & Neustadt, P.C.

(57) ABSTRACT

The present invention provides an optical fiber having dispersion of −8 ps/nm/km or less at a wavelength of 1460 nm including a reference layer which is a reference of a refractive index profile and at least three glass layers that exist inside the reference layer, characterized in that when it is assumed that the maximum relative refractive index difference of the first glass layer formed innermost of the at least three glass layers with respect to the reference layer is $\Delta 1$, the relative refractive index difference of the second glass layer formed second from the inside with respect to the reference layer is $\Delta 2$, the relative refractive index difference of the third glass layer formed third from the inside with respect to the reference layer is $\Delta 3$ and the relative refractive index difference of the reference layer with respect to pure quartz glass is $\Delta C$, $\Delta 1 > \Delta 3 > \Delta 2$, $\Delta 1 \geq 1.0\%$ and $\Delta C < 0$ are satisfied, and further provides an optical-module and a Raman amplifier using the optical fiber.

12 Claims, 2 Drawing Sheets

OPTICAL FIBER, AND OPTICAL MODULE AND RAMAN AMPLIFIER USING THE OPTICAL FIBER

BACKGROUND OF THE INVENTION

1. Field of the Invention

The present invention relates to an optical fiber preferably used for high-speed optical communication, optical module and Raman amplifier using the optical fiber.

2. Related Background Art

A dispersion compensating technique is indispensable for realizing high-speed optical communication, and a dispersion compensating fiber (DCF) is generally used in the technique. The DCF is an optical fiber for compensating dispersion of an optical fiber in a used wavelength band, for example in a set wavelength band in a wavelength range of 1460 to 1625 nm. To provide a characteristic suitable for dispersion compensation, it is necessary to increase a relative refractive index difference of the center core of the DCF which is located in the center of the DCF, and therefore, the center core is normally doped with germanium of high concentration.

An optical signal processing technique which processes an optical signal as light itself without converting it to an electrical signal is required for high-speed optical communication systems. This technique requires an optical fiber that can produce a large nonlinear phenomenon, that is, a high nonlinear optical fiber. This high nonlinear optical fiber also needs a large relative refractive index difference of its center core, and therefore, the center core is doped with germanium of high concentration.

However, when the center core is doped with germanium of high concentration, the nonlinear refractive index increases, which results in a problem of provoking waveform distortion. The high nonlinear optical fiber has a characteristic in which waveform distortion occurs when the nonlinear coefficient is increased. But, since the high nonlinear optical fiber for a Raman amplifier has the problem of double Rayleigh scattering, the germanium concentration of the center core is now being questioned.

Furthermore, when the DCF or the high nonlinear optical fiber is drawn, many defects and structural inconsistency are caused in the center core during drawing because the glass softening point of the center core is considerably different from that of the cladding. Due to this fact, there is a problem that it is difficult to reduce the transmission loss of the optical fiber.

SUMMARY OF THE INVENTION

The present invention has been implemented under such circumstances, and it is an object of the present invention to provide an optical fiber that has a refractive index profile satisfying desired characteristics and realizes a low loss by reducing the refractive index of the cladding lower than that of pure quartz glass to reduce germanium concentration of the center core. The present invention further provides an optical module and Raman amplifier using this optical fiber.

In order to solve the above described problems, the present invention provides an optical fiber provided with a plurality of glass layers having dispersion of −8 ps/nm/km or less at a wavelength of 1460 nm, the composition of one of the plurality of glass layers is different from the composition of glass layers adjacent to the one glass layer, the plurality of glass layers comprise a reference layer to be referenced for a refractive index profile and at least three glass layers are provided on inside of the reference layer, and $\Delta1 > \Delta3 > \Delta2$, $\Delta1 \geq 1.0\%$ and $\Delta C < 0$ are satisfied wherein $\Delta1$ denotes the maximum relative refractive index difference of the first glass layer formed innermost of the at least three glass layers with respect to the reference layer, $\Delta2$ denotes the relative refractive index difference of the second glass layer formed second from the inside with respect to the reference layer, $\Delta3$ denotes the relative refractive index difference of the third glass layer formed third from the inside with respect to the reference layer, and $\Delta C$ denotes the relative refractive index difference of the reference layer with respect to pure quartz glass.

The optical fiber of the present invention in the above described configuration more preferably satisfies $1.0\% \leq \Delta1 \leq 3.0\%$, $-1.0\% \leq \Delta2 \leq -0.4\%$ and $0\% < \Delta3 \leq 0.5\%$.

Further, the present invention provides an optical module characterized by comprising the above described optical fiber.

Furthermore, the present invention provides a Raman amplifier characterized in that a pumping light source for Raman amplification is connected to the above described optical module.

DESCRIPTION OF THE PREFERRED EMBODIMENTS

With reference now to the attached drawings, various embodiments of the present invention will be explained below.

As it is known, a nonlinear coefficient can be defined by n2/Aeff and the waveform distortion is more likely to occur if the nonlinear coefficient is greater. Where n2 is a nonlinear refractive index and Aeff is an effective core area. Furthermore, since n2 is determined by germanium concentration of the center core, n2 increases by increasing the germanium concentration. But, simultaneously, there is a problem that Rayleigh scattering also increases. In contrast, Aeff can be expanded by increasing the relative refractive index difference of the center core with respect to the cladding. Aeff can also be expanded by reducing the refractive index of the cladding even if the germanium concentration is reduced.

In this case, if fluorine is used as a dopant for reducing the refractive index of the cladding, the glass softening point of the cladding approaches the glass softening point of the center core simultaneously with the lowering of the refractive index of the cladding, and therefore it is possible to prevent the generation of defects or structural inconsistency which occurs during drawing. Therefore, an optical fiber having low loss and low nonlinear coefficient can be realized.

In this case, the glass softening point of the cladding is preferably 1200 to 1500° C., etc., in contrast to the glass softening point of 1600° C. of pure quartz glass.

To realize this, the amount of fluorine doped to the cladding is preferably an amount of doping which corresponds to the relative refractive index difference $\Delta C$ with respect to pure quartz glass of approximately −0.6 to −0.1%.

EXAMPLE 1

24 types of optical fibers (fibers A to X) having the optical characteristic in Tables 1 to 3 shown below were produced. The optical fibers have refractive index profiles of a W-shaped profile as shown in FIG. 1 or a W-segment profile as shown in FIG. 2.

Figure 1:
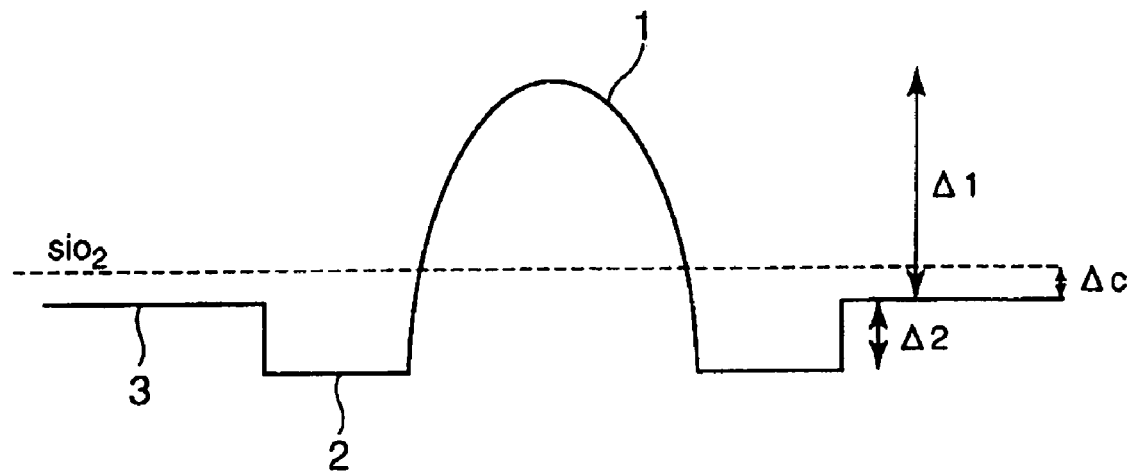
FIG. 1 illustrates a refractive index profile of an optical fiber according to an embodiment of the present invention.
Figure 2:
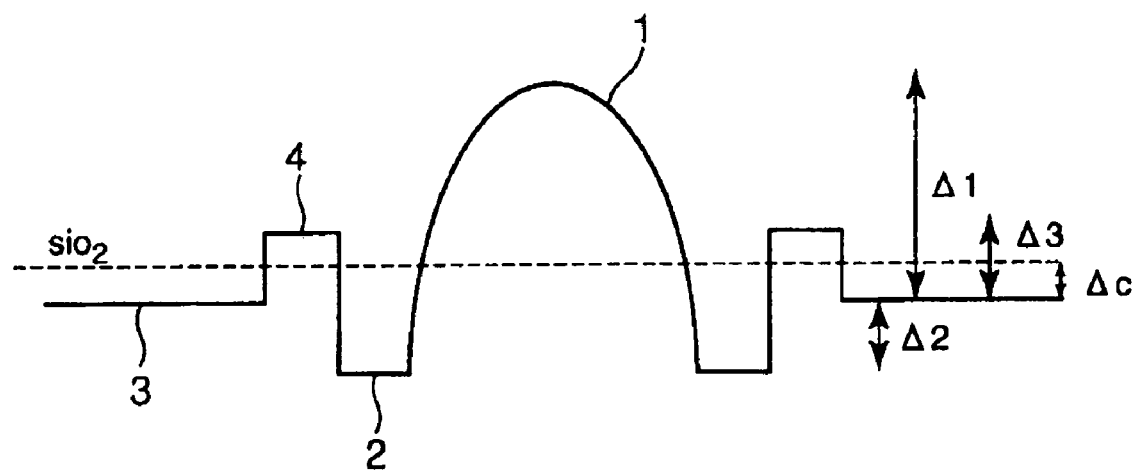
FIG. 2 illustrates a refractive index profile of an optical fiber according to another embodiment of the present invention.

That is, the W-shaped profile shown in FIG. 1 consists of a first glass layer 1 forming the center core, a second glass layer 2 surrounding the first glass layer 1 and a reference layer 3 forming the cladding surrounding the second glass layer 2. The W-segment profile shown in FIG. 2 consists of a first glass layer 1 forming the center core, a second glass layer 2 surrounding the first glass layer 1, a third glass layer 4 surrounding the second glass layer 2 and a reference layer 3 forming the cladding surrounding the third glass layer 4.

In these Tables, Δ1 denotes the refractive index difference of the first glass layer 1 with respect to the cladding 3, Δ2 denotes the refractive index difference of the second glass layer 2 with respect to the cladding 3, Δ3 denotes the refractive index difference of the third glass layer 1 with respect to the cladding 3, and ΔC denotes the refractive index difference of the cladding 4 with respect to the pure quartz glass. Each of Δ1, Δ2, Δ3 and ΔC is defined by the following Expressions (1) to (4), respectively:

$$\Delta 1 = \{(n_1^2 - n_c^2)/2n_1^2\} \times 100 \quad (1)$$

$$\Delta 2 = \{(n_2^2 - n_c^2)/2n_2^2\} \times 100 \quad (2)$$

$$\Delta 3 = \{(n_3^2 - n_c^2)/2n_3^2\} \times 100 \quad (3)$$

$$\Delta C = \{(n_c^2 - n_s^2)/2n_c^2\} \times 100 \quad (4)$$

where $n_1$ is the maximum refractive index of the first glass layer 1, $n_2$ is the refractive index of the second glass layer 2, $n_c$ is the refractive index of the cladding 3 and $n_s$ is the refractive index of the pure quartz glass. These values can be modified by adjusting the amount of germanium or amount of fluorine doped when a preform is synthesized.

Further, GR denotes a Raman gain and DPS denotes a value obtained by dividing dispersion by a dispersion slope in these Tables.

In an optical fiber of the present invention, the DPS at a used wavelength is preferably a positive value smaller than 330 nm. Thus, by setting the DPS at a used wavelength to a positive value smaller than 330 nm, it is possible to achieve a compensation rate of 90% or more when this optical fiber is used as a dispersion compensating fiber for a conventional single-mode optical fiber (SMF) having zero dispersion wavelength within 1.3 μm wavelength band (1280–1330 nm). In the case of a non-zero dispersion-shifted fiber (NZ-DSF), a DPS of smaller than 330 nm is suitable and about 50 nm might be optimum. For this reason, by setting a DPS to at least equal to or smaller than 330 nm, the optical fiber can function as a dispersion compensating fiber for NZ-DSF and SMF.

TABLE 1

| | Δ1 % | Δ2 % | Δ3 % | ΔC % | Transmission loss 1550 nm dB/km | Dispersion 1550 nm ps/nm/km | Dispersion slope 1550 nm ps/nm2/km | GR 1450 nm pump (m/W) | Rayleigh scattering coefficient 1550 nm (1/m) | Aeff 1550 nm um² | λc nm | DPS 1550 nm nm |
|---|---|---|---|---|---|---|---|---|---|---|---|---|
| A | 2.0 | −0.55 | 0.2 | 0 | 0.53 | −100 | −0.35 | 1.1e-13 | 1.0e-6 | 16 | 1500 | 286 |
| B | 2.0 | −0.55 | 0.2 | −0.2 | 0.44 | −103 | −0.36 | 1.1e-13 | 1.0e-6 | 16 | 1500 | 286 |
| C | 2.0 | −0.55 | 0.2 | −0.2 | 0.47 | −132 | −0.48 | 1.2e-13 | 1.0e-6 | 15 | 1520 | 275 |
| D | 2.0 | −0.55 | 0 | 0 | 0.40 | −70 | −0.21 | 0.9e-13 | 1.0e-6 | 17 | 800 | 333 |
| E | 2.0 | −0.55 | 0 | −0.2 | 0.35 | −70 | −0.21 | 0.9e-13 | 1.0e-6 | 17 | 805 | 333 |
| F | 2.2 | −0.55 | 0 | −0.2 | 0.37 | −90 | −0.25 | 1.0e-13 | 1.0e-6 | 16 | 780 | 360 |
| G | 1.5 | −0.4 | 0.2 | 0 | 0.35 | −40 | −0.39 | 0.5e-13 | 0.6e-6 | 18 | 1480 | 103 |
| H | 1.5 | −0.4 | 0.2 | −0.2 | 0.31 | −40 | −0.38 | 0.5e-13 | 0.5e-6 | 18 | 1480 | 105 |
| I | 1.7 | −0.4 | 0.2 | −0.2 | 0.33 | −70 | −0.61 | 0.6e-13 | 0.6e-6 | 17 | 1390 | 115 |

TABLE 2

| | Δ1 % | Δ2 % | Δ3 % | ΔC % | Transmission loss 1600 nm dB/km | Dispersion 1600 nm ps/nm/km | Dispersion slope 1600 nm ps/nm2/km | GR 1500 nm pump (m/W) | Rayleigh scattering coefficient 1600 nm (1/m) | Aeff 1600 nm um² | λc nm | DPS 1600 nm nm |
|---|---|---|---|---|---|---|---|---|---|---|---|---|
| J | 1.8 | −0.4 | 0.2 | 0 | 0.35 | −110 | −0.31 | 1.0e-13 | 0.8e-6 | 18 | 1540 | 355 |
| K | 1.8 | −0.4 | 0.2 | −0.2 | 0.30 | −110 | −0.31 | 1.0e-13 | 0.8e-6 | 18 | 1535 | 355 |
| L | 2.0 | −0.4 | 0.2 | −0.2 | 0.33 | −120 | −0.30 | 1.1e-13 | 0.8e-6 | 17 | 1500 | 400 |
| M | 2.4 | −0.6 | 0 | 0 | 0.51 | −100 | −0.26 | 1.2e-13 | 1.0e-6 | 17 | 780 | 385 |
| N | 2.4 | −0.6 | 0 | −0.1 | 0.46 | −100 | −0.27 | 1.2e-13 | 1.0e-6 | 17 | 780 | 370 |
| O | 2.5 | −0.6 | 0 | −0.1 | 0.48 | −120 | −0.25 | 1.3e-13 | 1.0e-6 | 16 | 750 | 480 |
| P | 1.1 | −0.5 | 0 | 0 | 0.27 | −9 | −0.12 | 0.2e-13 | 0.3e-6 | 18 | 800 | 75 |
| Q | 1.1 | −0.5 | 0 | −0.2 | 0.24 | −10 | −0.12 | 0.2e-13 | 0.3e-6 | 18 | 800 | 83 |
| R | 1.3 | −0.5 | 0 | −0.2 | 0.25 | −18 | −0.12 | 0.3e-13 | 0.3e-6 | 18 | 790 | 150 |

TABLE 3

| | Δ1 % | Δ2 % | Δ3 % | ΔC % | Transmission loss 1500 nm dB/km | Dispersion 1500 nm ps/nm/km | Dispersion slope 1500 nm ps/nm2/km | GR 1400 nm pump (m/W) | Rayleigh scattering coefficient 1500 nm (l/m) | Aeff 1500 nm um$^2$ | λc nm | DPS 1500 nm nm |
|---|---|---|---|---|---|---|---|---|---|---|---|---|
| S | 2.4 | −0.55 | 0.2 | 0 | 0.62 | −110 | −0.54 | 1.0e−13 | 1.0e−6 | 14 | 1355 | 204 |
| T | 2.4 | −0.55 | 0.2 | −0.1 | 0.54 | −110 | −0.53 | 1.0e−13 | 1.0e−6 | 14 | 1350 | 208 |
| U | 2.6 | −0.55 | 0.2 | −0.1 | 0.56 | −140 | −0.52 | 1.1e−13 | 1.0e−6 | 13 | 1300 | 269 |
| V | 1.0 | −0.4 | 0 | 0 | 0.62 | −8.3 | −0.05 | 0.3e−13 | 0.3e−6 | 18 | 780 | 166 |
| W | 1.1 | −0.4 | 0 | −0.1 | 0.57 | −8.5 | −0.05 | 0.3e−13 | 0.3e−6 | 18 | 780 | 170 |
| X | 1.1 | −0.4 | 0 | −0.1 | 0.65 | −11.2 | +0.01 | 0.4e−13 | 0.3e−6 | 17 | 760 | −1120 |

The 24 types of optical fibers include fibers whose reference layers are pure quartz glass with. ΔC=0 and a plurality of fibers with fluorine-doped cladding with ΔC<0. And they also include the optical fibers whose Δ1 are the same though refractive indexes of reference layers (ΔC) are different and the optical fibers whose germanium concentrations are the same though Δ1 are different.

Among these fibers, the fiber A and fiber B have the same Δ1, Δ2 and Δ3 and only ΔC is different. Since the fiber A and fiber B have the same refractive index profile, the fiber A and fiber B have substantially the same Aeff and dispersion characteristic, but the fiber B having the fluorine-doped cladding has a transmission loss lower than the fiber A. This is caused that fluorine is doped to the cladding, and thereby, the softening point of the cladding has lowered and low temperature drawing can be realized.

Therefore, an optical module using the fiber B can compensate for the same amount of dispersion with the same length as that of the optical module using the fiber A and provides an optical module with low transmission loss.

The fiber A and fiber C have the same germanium concentration of the center core. When these fibers are compared, the fiber C with the fluorine-doped cladding has a greater Raman gain, while these fibers have substantially the same Rayleigh scattering coefficient. This is because that irrespective of the same germanium concentration, the fiber C with the fluorine-doped cladding can increase Δ1 and decrease Aeff.

Furthermore, since the fiber C has an increasing Raman gain and reduced transmission loss, a required gain with lower pumping power can be realized by a DCRA (dispersion compensating Raman amplifier) using an optical module including the fiber C.

Since the fiber A and fiber C have substantially the same Rayleigh scattering coefficient, the DCRA formed by the fiber C can obtain a desired Raman gain with lower pumping power, and can thereby realize low noise. This is also similar to the fiber D and fiber F, fiber G and fiber I, fiber J and fiber L, fiber M and fiber O, fiber P and fiber R, fiber S and fiber U, and fiber V and fiber X.

However, what is different among them is a cutoff wavelength. Since the cutoff wavelength of the fiber C is 1520 nm, that is, smaller than 1530 nm, it can be used in a C-band (1530 nm to 1565 nm) or longer. Furthermore, if the cutoff wavelength is set to 100 nm or shorter of the used wavelength band, that is, 1430 nm or shorter, it can be used as a Raman amplification medium in the C-band.

Likewise, when an L-band (1565 nm to 1625 nm) is set as the used wavelength band, it is necessary to set the cutoff wavelength to 1565 nm or shorter and further setting the cutoff wavelength to 1465 nm or shorter allows it to be used as a Raman amplification medium in the L-band.

Furthermore, when an S-band (1460 nm to 1530 nm) is set as the used wavelength, it is necessary to set the cutoff wavelength to 1460 nm or shorter and further setting the cutoff wavelength to 1360 nm or shorter allows it to be used as a Raman amplification medium in the S-band.

That is, the fiber T whose cutoff wavelength is 1350 nm can be used as a Raman amplifier in any one of the S-band to L-band.

In this context, the cutoff wavelength refers to a fiber cutoff wavelength λc which is defined in the ITU-T (International Telecommunication Union-Telecommunication Standardization Sector) G.650.1. Other terms not specially defined in the present specification are in accordance with the definitions and measuring method of ITU-T G.650.1.

Furthermore, fiber B and fiber E have the same Δ1 and Δ2, but have different magnitudes of Δ3. That is, while fiber E has Δ3 of the third layer of 0% and has a W-shaped profile, fiber B has a W-segment profile. The characteristic difference between the two is the magnitude of dispersion. By providing the third layer and the W-segment profile, the cutoff wavelength is shifted to a longer wavelength, but a negative dispersion slope with a large absolute value can be realized. Therefore, fiber B can realize a sufficiently small DPS even if the absolute value of dispersion is increased.

Further decreasing the diameter of the center core of the fiber E having a W-shaped profile makes it possible to increase the absolute value of dispersion, but at the same time increases loss and prevents transmission in the C-band.

By providing the third layer and making the W-segment profile in this way, it is possible to increase the absolute value of dispersion and dispersion slope, and at the same time it becomes easy to adjust the profile.

This makes it possible to obtain the desired optical fiber characteristic and manufacture the optical fiber with high yield.

EXAMPLE 2

Using the fiber A and fiber B, a Raman amplifier for compensating SMF having the length of 50 km in the C-band was produced. Since these two fibers have substantially the same dispersion, two optical modules were produced using an 8 km fiber for both. The configuration is as shown in FIG. 3.

Figure 3:
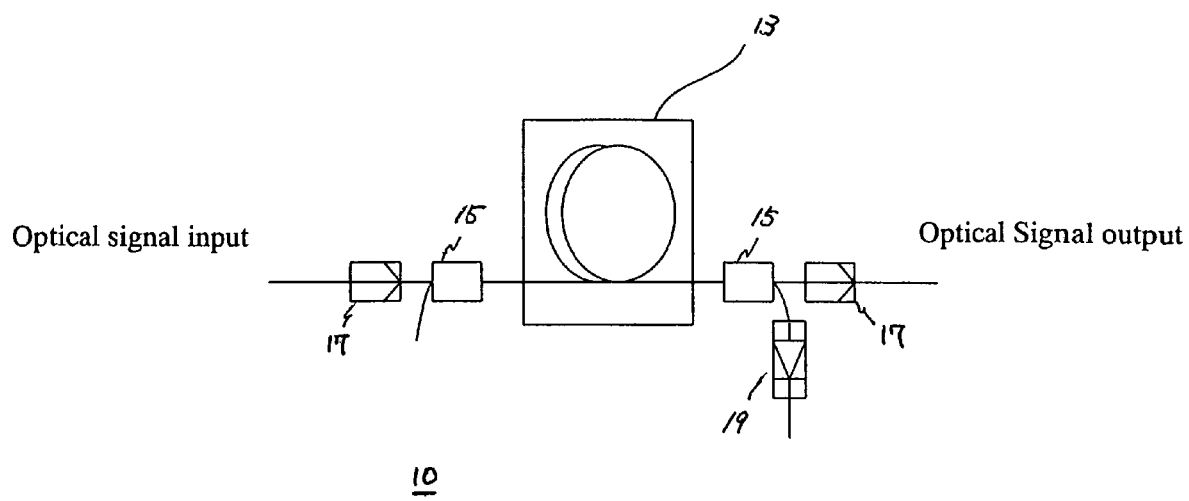
FIG. 3 illustrates an optical module constructed using the optical fiber according to an embodiment of the present invention.

FIG. 3 shows the Raman amplifier 10 to which the optical fiber of the present invention is applied. The Raman amplifier 10 shown in FIG. 3 includes the optical module 13, couplers 15, isolators 17 and pumping light 19.

Since these two optical modules have the same fiber length and Raman gain of the optical fibers used but have different transmission losses, the pumping power required to realize loss-less modules was 55 mW (fiber A) and 49 mW (fiber B). For this reason, the DCRA using the fiber A has greater noise due to double Rayleigh scattering and the DCRA using the fiber B showed an improvement of noise index by 1 dB. Here, SMF was used as the fiber for the transmission line, but it is apparent that if the fiber H is used it is also applicable to an NZ-DSF.

Furthermore, using the fiber K and fiber T, they are applicable to not only the C-band but also the L-band, S-band or a plurality of wavelengths including them.

As shown above, the present invention makes it possible to produce a low loss optical fiber. Furthermore, with reduced germanium concentration of the center core, the present invention can realize an optical fiber with reduced double Rayleigh scattering.

Furthermore, adopting a W-segment profile, it makes possible to obtain the desired optical fiber characteristic easily and manufacture optical fibers with high yield.

The present invention can be effectively used for dispersion compensating optical fiber and high nonlinear optical fiber in particular.

It should be noted that the above disclosure of the embodiments are intended to be illustrative, rather than exhaustive, of the present invention. One skilled in the art will be able to make any additions and/or modification to the embodiment disclosed in the above without departing from the spirit of the invention or its scope, as defined by the following claims.

What is claimed is:

1. An optical fiber having a plurality of glass layers and a dispersion of −8 ps/nm/km or less at a wavelength of 1460 nm,
wherein;
a composition of one of said plurality of glass layers is different from a composition of glass layers adjacent to said one glass layer;
said plurality of glass layers comprises a reference layer to be referenced for a refractive index profile and at least three glass layers provided on the inside of said reference layer; and,
$\Delta 1 > \Delta 3 > \Delta 2$, $\Delta 1 \geq 1.0\%$ and $\Delta C < 0$ are satisfied wherein $\Delta 1$ is the maximum relative refractive index difference of the first glass layer formed innermost of said at least three glass layers with respect to said reference layer, $\Delta 2$ is the relative refractive index difference of the second glass layer formed second from the inside with respect to said reference layer, $\Delta 3$ is the relative refractive index difference of the third glass layer formed third from the inside with respect to said reference layer, and $\Delta C$ is the relative refractive index difference of said reference layer with respect to pure quartz glass, wherein conditions $1.0\% \leq \Delta 1 \leq 3.0\%$, $-1.0\% \leq \Delta 2 \leq -0.4\%$, $0\% < \Delta 3 \leq 0.5\%$ are also satisfied.

2. The optical fiber according to claim 1, wherein said reference layer is made of fluorine-doped glass.

3. The optical fiber according to claim 1, wherein a glass softening point of the glass of said reference layer is lower than the softening point of pure quartz glass.

4. The optical fiber according to claim 1, wherein a cutoff wavelength is shorter than 1565 nm.

5. The optical fiber according to claim 1, wherein a cutoff wavelength is shorter than 1530 nm.

6. The optical fiber according to claim 1, wherein a cutoff wavelength is shorter than 1465 nm.

7. The optical fiber according to claim 1, wherein a cutoff wavelength is shorter than 1460 nm.

8. The optical fiber according to claim 1, wherein a cutoff wavelength is shorter than 1430 nm.

9. The optical fiber according to claim 1, wherein a cutoff wavelength is shorter than 1360 nm.

10. The optical fiber according to claim 1, wherein a value obtained by dividing dispersion by a dispersion slope at a wavelength of 1550 nm is a positive value and smaller than 330 nm.

11. An optical module comprising an optical fiber said optical fiber having a plurality of glass layers and dispersion of −8 ps/nm/km or less at a wavelength of 1460 nm, wherein;
a composition of one of said plurality of glass layers is different from a composition of glass layers adjacent to said one glass layer;
said plurality of glass layers comprises a reference layer to be referenced for a refractive index profile and at least three glass layers which exist inside said reference layer; and
$\Delta 1 > \Delta 3 > \Delta 2$, $\Delta 1 \geq 1.0\%$ and $\Delta C < 0$ are satisfied wherein $\Delta 1$ is the maximum relative refractive index difference of the first glass layer formed innermost of said at least three glass layers with respect to said reference layer, $\Delta 2$ is the relative refractive index difference of the second glass layer formed second from the inside with respect to said reference layer, $\Delta 3$ is the relative refractive index difference of the third glass layer formed third from the inside with respect to said reference layer, and $\Delta C$ is the relative refractive index difference of said reference layer with respect to pure quartz glass, wherein conditions $0.1\% \leq \Delta 1 \leq 3.0\%$, $-1.0\% \leq \Delta 2 \leq -0.4\%$, $0\% < \Delta 3 \leq 0.5\%$ are also satisfied.

12. A Raman amplifier comprising an optical module with a Raman amplification pumping light source connected thereto, said optical module comprising an optical fiber, said optical fiber having a plurality of glass layers and a dispersion of −8 ps/nm/km or less at a wavelength of 1460 nm, wherein;
a composition of one of said plurality of glass layers is different from a composition of glass layers adjacent to said one glass layer;
said plurality of glass layers comprises a reference layer to be referenced for a refractive index distribution and at least three glass layers which exist inside said reference layer; and
$\Delta 1 \geq \Delta 3 > \Delta 2$, $\Delta 1 \geq 1.0\%$ and $\Delta C < 0$ are satisfied wherein $\Delta 1$ is the maximum relative refractive index difference of the first glass layer formed innermost of said at least three glass layers with respect to said reference layer, $\Delta 2$ is the relative refractive index difference of the second glass layer formed second from the inside with respect to said reference layer, $\Delta 3$ is the relative refractive index difference of the third glass layer formed third from the inside with respect to said reference layer, and $\Delta C$ is the relative refractive index difference of said reference layer with respect to pure quartz glass, wherein conditions $1.0\% \leq \Delta 1 \leq 3.0\%$, $-1.0\% \leq \Delta 2 \leq -0.4\%$, $0\% < \Delta 3 \leq 0.5\%$ are also satisfied.

* * * * *